United States Patent [19]

Rattunde et al.

[11] Patent Number: 4,813,918

[45] Date of Patent: Mar. 21, 1989

[54] A PLATE LINK CHAIN FOR RADIALLY VARIABLE WIDTH PULLEY DRIVES HAVING THRUST MEMBERS OF DIFFERENT LENGTHS

[75] Inventors: Manfred Rattunde; Hans-Jurgen Wolf, both of Bad Homburg, Fed. Rep. of Germany

[73] Assignee: Reimers Getriebe AG, Zug, Switzerland

[21] Appl. No.: 84,946

[22] Filed: Aug. 13, 1987

[51] Int. Cl.⁴ ............................................. F16G 1/24
[52] U.S. Cl. ................................. 474/245; 474/201; 474/206
[58] Field of Search ............... 474/245, 201, 212–217, 474/229

[56] References Cited

FOREIGN PATENT DOCUMENTS 1122795  1/1962  Fed. Rep. of Germany ...... 474/201

Primary Examiner—Thuy M. Bui
Attorney, Agent, or Firm—Edwin E. Greigg

[57] ABSTRACT

A plate-link chain for infinitely adjustable cone pulley drives, the link pivot elements of which, joining the individual chain links embodied by plate packets, are embodied as thrust members is disclosed. The thrust members are inserted into recesses of the plate-links, and with their end faces they serve to transfer frictional force between friction wheels and the plate-link chain. The embodiment is such that the length of the thrust members of individual links, defined crosswise to the direction of travel of the plate-link chain varies in a non-periodic sequence over the length of the chain.

7 Claims, 2 Drawing Sheets

A PLATE LINK CHAIN FOR RADIALLY VARIABLE WIDTH PULLEY DRIVES HAVING THRUST MEMBERS OF DIFFERENT LENGTHS

BACKGROUND OF THE INVENTION

The invention relates to a plate link chain for infinitely adjustable cone pulley drives, the link pivot elements of which, joining the individual chain links embodied by plate link packets, are embodied as thrust members, which are inserted into recesses of the plate-links and with their end faces serve to transfer frictional force between friction wheels and the plate-link chain.

Chains of this type have a great variety of embodiments in terms of the link pivot elements, with respect to which reference can be made merely by way of example to German Pat. Nos. 1 302 795, 2 356 289, 2 848 167, 3 027 834 and 3 129 631. The link pivot elements may be cylindrical link pins, pairs of link pivot elements in the same recess, or the like.

In all the plate-link chains of the type in question, there are impacts, hence producing undesirable structure-borne sound, between the thrust members and the friction wheels when the chain enters the wedge of a pair of friction wheels. These noises are particularly disagreeable whenever the periodic impacts enter the range of resonant vibrations of parts of the drive mechanism, such as the friction wheels and the housing walls, and they are subjectively perceived as particularly annoying when they are heard as a piercing single tone, possibly along with its harmonic.

An attempt has been made to address this problem by reducing the chain graduation and hence lessening the spacing between adjoining link pivot elements, so as to increase the frequency of pulses and decrease their intensity. Another attempt that was made involved impeding the uniformity of the single-tone production by providing for a non-uniform chain graduation, which also aided in hindering the buildup of vibrations.

Although these provisions were quite successful, still it has been realized that there is a need for further improvement in terms of noise reduction, because for other reasons, such as structurally dictated chain lengths, it has not been possible to fully exploit these provisions.

OBJECT AND SUMMARY OF THE INVENTION

It is accordingly the object of the invention to modify or improve a plate-link chain of these generic type such that an improvement in noise reduction and a further avoidance of resonant vibrations and single tones is attained. The provisions to be made should also be economical, or in other words should not notably affect the actual composition and function of the chain or its production cost.

In a plate-link chain of the above type, this object is attained in accordance with the invention in that the length of the thrust members of individual links, defined crosswise to the direction of travel of the plate-link chain, varies in a non-periodic sequence over the length of the chain.

The effect of this provision is that in the curve where the chain as it passes between the friction wheels and wraps therearound, the thrust members likewise move variously far, in terms of the radial direction, into the wedge of the wheels, which also results in variable tilting angles between adjacent chain links, which affects the magnitude of the normal force exerted upon the thrust members by the friction wheel and thus finally affects the acoustical energy generated in the development of the normal force. In this connection, the invention is based on the recognition that the normal force varies approximately in proportion with the tilting angle between adjacent chain links, or in other words varies with this tilting angle.

As a result of the non-periodic distribution of the thrust members of variable length, a disruption in the regularity of the acoustic generation and hence an elimination of single tones is attained.

It has proved to be effective for the chain to have thrust members of two different lengths. This has proved adequate, and it also simplifies the manufacture and stocking as compared with the situation when several different thrust members are needed.

The change in length of some of the thrust members as compared with the "normal" thrust members may basically be effected in both the positive and the negative directions. It has proved advantageous, however, for the length of approximately 5% to 30% of the thrust members of a chain to be less than that of the remaining thrust members.

The difference in the lengths of the thrust members is dimensioned such that when the plate-link chain revolves, a contact that effects a transfer of frictional force takes place between friction wheels and all the thrust members. To give some idea of the orders of magnitude involved, it can be noted that with a V-groove angle of 20° and a chain width or thrust member length on the order of approximately 25 mm, the difference in length is on the order of approximately 0.2 mm.

Furthermore, it is also suitable in individual cases for the length of individual thrust members to be dimensioned such that no contact takes place between them and the friction wheels. This provision, which is intended to apply to only a few thrust members, in useful to attain a more pronounced disruption in the production of single tones.

The subject of the invention is applicable to all plate-link chains of the generic type described above, including plate-link chains with non-uniform chain graduation, and it also leads, additively to the provisions mentioned at the outset above, to a further improvement in reduction of the noise level during operation.

The invention will be better understood and further objects and advantages thereof will become more apparent from the ensuring detailed description of preferred embodiments taken in conjunction with the drawings.

DESCRIPTION OF THE PREFERRED EMBODIMENTS

Figure 1:
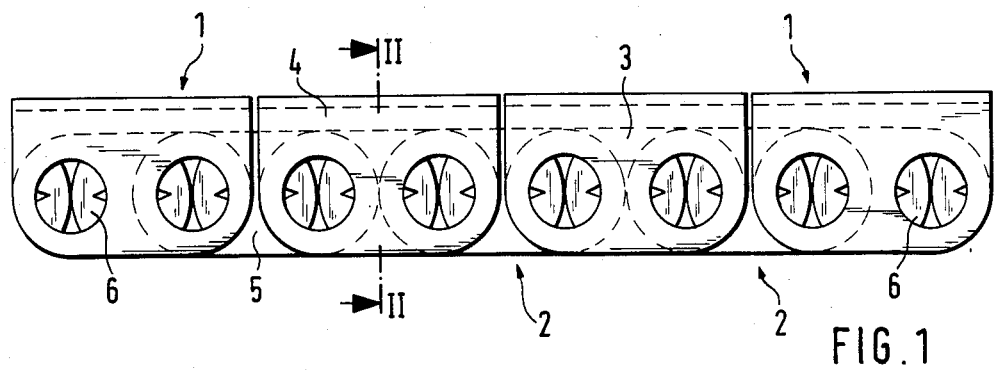
FIG. 1 shows a side view of a plate link chain.
Figure 2:
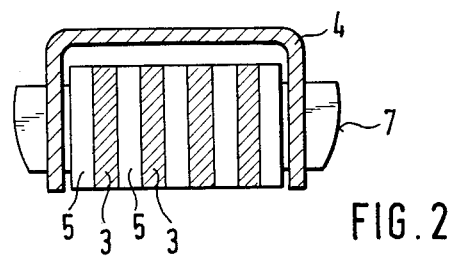
FIG. 2 shows the plate link chain in a sectional view taken along the line II—II of FIG. 1.

FIGS. 1 and 2 show a plate-link chain having chain links 1 and chain links 2 disposed between them. The chain links 1 comprise plate-links 3 and U-shaped curved clamping plats 4, while the chain links 2 comprise plate-links 5. The individual chain links 1 and 2 are pivotably connected to one another at their linking points by means of thrust members in the form of pairs 6 of cradle elements; these pairs 6 are in form-locking engagement with adjacent chain links in order to prevent twisting and as shown it will be seen that these pairs are arranged to roll off one another by means of their cradle faces being oriented toward one another. The cradle elements of these pairs 6 have end faces 7 with which they enter into frictional contact with the friction wheels of a cone pulley drive.

To the extent it has been described above, the plate-link chain is known; it has been described again for the sake of understanding and is intended to serve as a representative example of the numerous other types of known plate link chains for cone pulley drives. In this chain, the thrust members, here embodied as cradle elements 6, all have the same length. This is where the modification, leading to the novel structure, begins, with the length of the thrust members being various. The effect of this will now be described in detail, referring to FIGS. 3 and 4.

Figure 3:
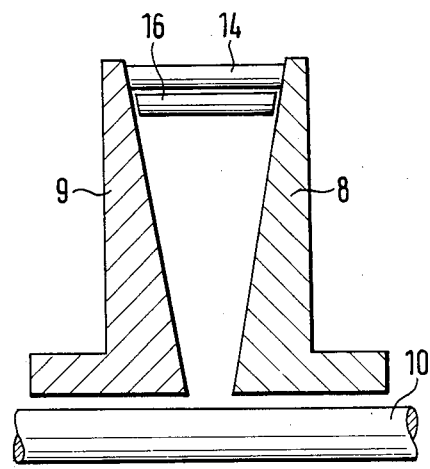
FIG. 3 shows the pairing of friction wheels and thrust members in a simplified fragmentary axial section taken through one set of wheels.

FIG. 3 shows the upper half section of two friction wheels 8, 9, which are disposed on a drive shaft 10. Between the friction wheels, a plate-link chain (see also FIG. 4), the links 11 of which are shown in stylized form, travels and wraps around the friction wheels with a "normal" arc having the radius 12, along which arc the chain, with the thrust members of its pivot points 13, is in contact with the friction wheels 8, 9. These thrust members are identified by reference numeral 14 in FIG. 3.

Figure 4:
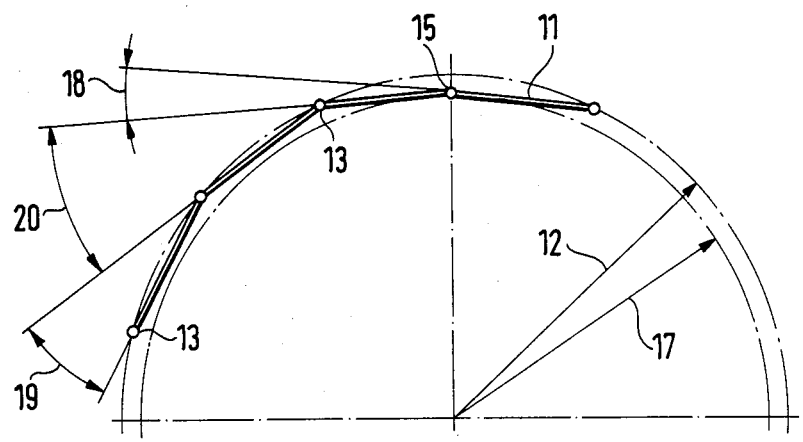
FIG. 4 is a simplified illustration of the curve where the chain wraps around the wheel, with some of the thrust members having been reduced in length.

Individual ones of the pivot points in FIG. 4 the pivot point 15, are now equipped with shorter thrust members 16, which consequently, under the tensile stress acting upon the plate link chain, enter farther into the wedge formed by the friction wheels 8, 9 and thus assume the travel radius 17 shown in FIG. 4. In a directly proportional manner, the result of this is that the plates adjoining a pivot point 15 having shorter thrust members 16 have a smaller tilting angle 18 with respect to one another than is the case with the tilting angle 19 of the chain links that have pivot points embodied by "normal" thrust members. The tilting angle 20 in the transition from one chain link 11 having a shorter link pivot element 16 to a chain link having two link pivot elements is even larger than the tilting angles 18 and 19.

Figure 5:
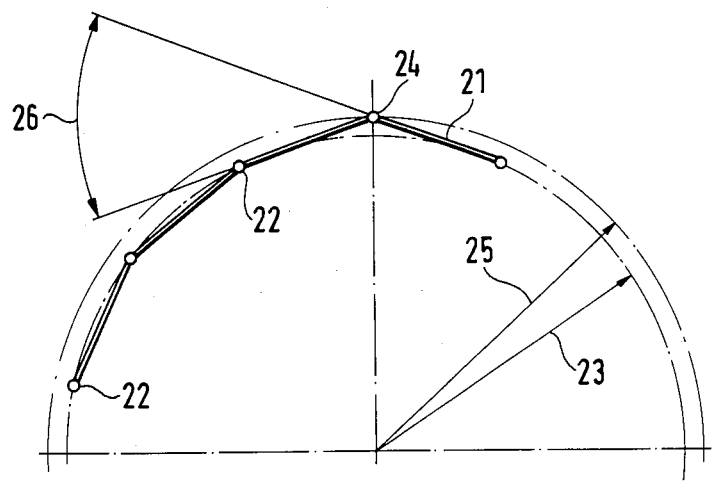
FIG. 5 is a simplified illustration of the curve where the chain wraps around the wheel, with some of the thrust members having been increased in length.

In contrast to FIG. 4, FIG. 5 shows the arc about which a chain is wrapped for a plate-link chain having chain links 21 the "normal" pivot points 22 of which move along a circular path having the radius 23, while a pivot point 24 has a comparably longer link pivot element, which consequently cannot enter so deeply into the wheel wedge as the link pivot elements of the pivot points 22 do and thus moves on a circular path having the larger radius 25. Herein, in a reversal of the situation shown in detail with reference to FIG. 4, the chain links 21 adjacent to the pivot point 24 have the largest tilting angle 26 with respect to one another.

Naturally, mixed forms using features of the possible embodiments shown in FIGS. 4 and 5 are also conceivable. For a few individual pivot points of a plate-link chain, it is also possible to provide that the link pivot elements are so short that they do not come into load-bearing contact with the friction wheels 8, 9 as shown in FIG. 6. This possibility is not shown in the drawing. Compared with what is shown in FIGS. 4 and 5, however, the chain links joined to one another by such a pivot point would form a straight line with one another.

The types of chain structure described with reference to FIGS. 3–5 have the effect that the link pivot elements that are shorter or longer than those in the rest of the chain bring about a reduction in the noise produced by the chain, and they impede or prevent both the generation of resonant vibrations and the prominence of individual tones.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A plate link chain for infinitely adjustable radially variable width friction wheels of a cone pulley drive, including hardened link pivot elements which, joining individual chain links embodied by plate-link packets, are embodied as linear thrust members, which are inserted into recesses of plate-links of said chain and with their end faces serve to transfer a frictional force between said friction wheels and the plate-link chain in which opposing facial surfaces of said friction wheels are flat in a radial direction,
    wherein the length of the thrust members (14, 16) of individual links, defined crosswise to a direction of travel of the plate-link chain, is different in a nonperiodic sequence over the length of the chain.

2. A plate link chain as defined in claim 1, in which said thrust members (14, 16) of said chain are of at least two different lengths.

3. A plate link chain as defined by claim 2, in which the difference in the lengths of the thrust members is dimensioned such that when the plate link chain revolves, a frictional-force-transferring contact takes place between friction wheels (8, 9) and all of said thrust members (14, 16).

4. A plate link chain as defined by claim 2, in which the length of approximately 5 to 30% of the thrust members (16) is less than that of the remaining thrust members (14).

5. A plate link chain as defined by claim 4, in which the differences in the lengths of the thrust members is dimensioned such that when the plate link chain revolves, a frictional-force-transferring contact takes place between friction wheels (8, 9) and all of said thrust members (14, 16).

6. A plate link chain as defined by claim 1, in which the difference in the lengths of the thrust members is dimensioned such that when the plate link chain revolves, a frictional-force-transferring contact takes place between friction wheels (8, 9) and all of said thrust members (14, 16).

7. A plate link chain as defined by claim 1, in which the length of individual thrust members is dimensioned such that no contact takes place between some of said individual thrust members and the friction wheels (8, 9).

* * * * *

UNITED STATES PATENT AND TRADEMARK OFFICE
CERTIFICATE OF CORRECTION

PATENT NO. : 4,813,918

DATED : March 21, 1989

INVENTOR(S) : Manfred Rattunde et al

It is certified that error appears in the above-identified patent and that said Letters Patent is hereby corrected as shown below:

Column 2, line 39, change "in" to -- is --.

Column 3, line 7, change "plats" to -- plates --.

Signed and Sealed this

Fifth Day of June, 1990

Attest:

HARRY F. MANBECK, JR.

*Attesting Officer*  *Commissioner of Patents and Trademarks*